No. 701,558. Patented June 3, 1902.
C. J. GILLING.
TIRE FOR VEHICLE WHEELS.
(Application filed Feb. 19, 1902.)
(No Model.)

WITNESSES:
F. A. Darrow.
O. E. Murray.

INVENTOR
Chas. J. Gilling
BY
Milo B. Stevens & Co.
ATTORNEYS.

UNITED STATES PATENT OFFICE.

CHARLES J. GILLING, OF CHICAGO, ILLINOIS.

TIRE FOR VEHICLE-WHEELS.

SPECIFICATION forming part of Letters Patent No. 701,558, dated June 3, 1902.

Application filed February 19, 1902. Serial No. 94,771. (No model.)

*To all whom it may concern:*

Be it known that I, CHARLES J. GILLING, a citizen of the United States, residing at Chicago, in the county of Cook and State of Illinois, have invented certain new and useful Improvements in Tires for Vehicle-Wheels; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to tires for vehicle-wheels, and particularly to that class of cushion-tires having a rubber cover inclosing segments of cork or similar light resilient substance.

The object of the invention is to improve the construction of such tires by the use of rubber partitions or sections integral with the cover, said partitions being between the cork segments, so that the latter are properly spaced and supported and are better protected against breakage and movement in the cover.

Figure 1:
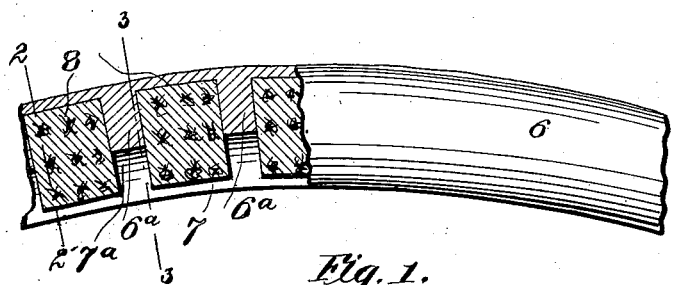
Figure 2:
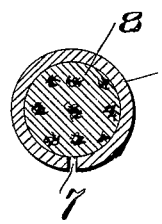
Figure 3:
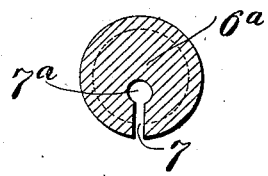
Figure 4:
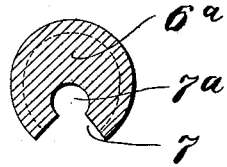
Figure 5:
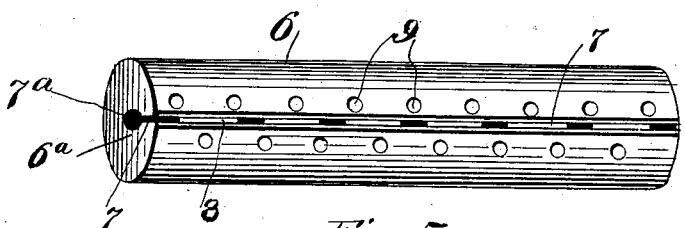

In the accompanying drawings, Figure 1 is an elevation, partly in section, of a piece of the tire. Fig. 2 is a cross-section thereof on the line 2 2. Fig. 3 is a cross-section on the line 3 3. Fig. 4 is a cross-section of the rubber partition, showing how the same may be opened or stretched laterally to permit the insertion of the cork segments. Fig. 5 is a perspective view of the tire, showing the base or inner face thereof.

Referring specifically to the drawings, 6 indicates a tubular rubber cover, the bore of which is divided into numerous cork-receiving chambers by partitions or sections $6^a$, which are molded in one piece with the cover. The cover and the sections are slitted longitudinally, as at 7, and the slits in the partitions $6^a$ terminate in recesses $7^a$. The purpose of these recesses is to permit the tire to be opened or stretched laterally, as shown in Fig. 4, so that the cork segments, which are indicated at 8, may be put in or taken out. Holes 9 are to receive laces to lace up the tire.

A tire constructed as above indicated will be lighter than if it were all rubber and stronger than if the core were cork only. The cork segments may be inserted or removed without any tools, as the tire can be stretched open by hand sufficiently for that purpose. The integral partitions prevent the core-segments from creeping, and a strong and resilient tire is formed free from the objections to all-rubber and pneumatic tires.

What I claim is—

A tire comprising a single tread-tube having spaced integral partitions across the bore thereof and a continuous slot extending entirely around the tire through the partitions and the rim-face of the tube, whereby the tube and the partitions may be spread open laterally, and disconnected separately-removable unperforated cork segments filling the spaces between the partitions.

In testimony whereof I affix my signature in presence of two witnesses.

CHARLES J. GILLING.

Witnesses:
 NELLIE FELTSKOG,
 HARRY G. BATCHELOR.